May 21, 1963    B. A. STEVENS    3,090,716
ADHESIVE TREATMENT AND ARTICLE OF MANUFACTURE
Filed Sept. 12, 1958
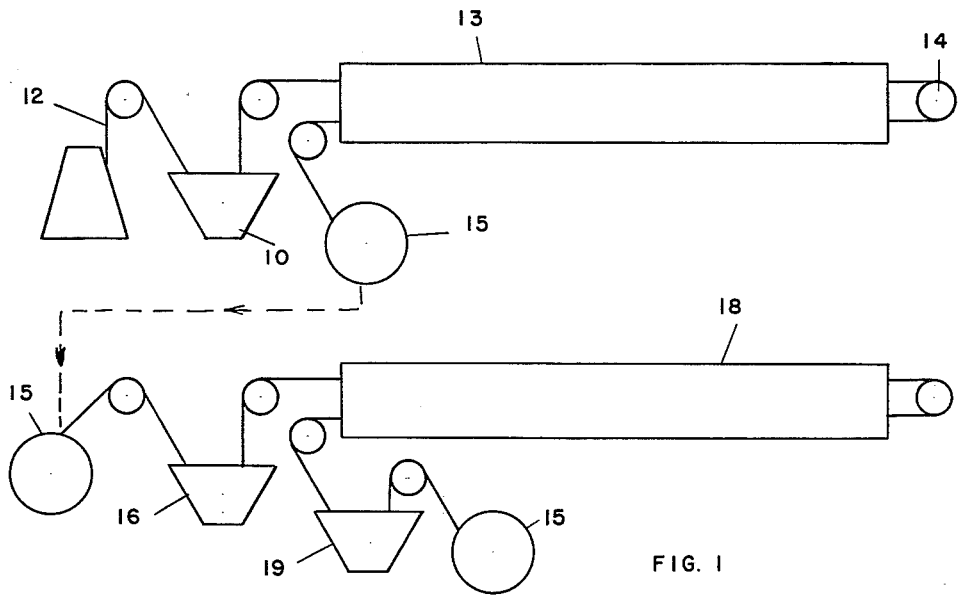
FIG. 1
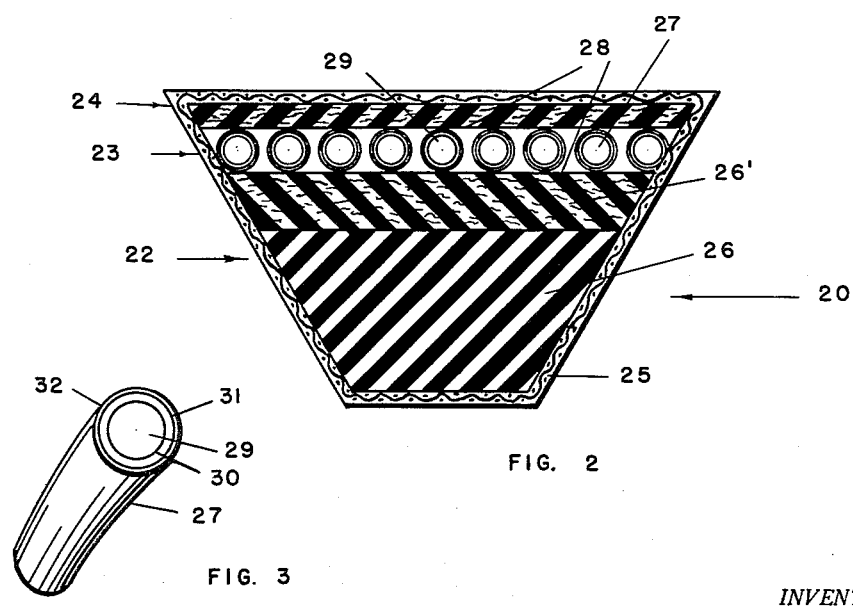
FIG. 2
FIG. 3
INVENTOR.
B. A. STEVENS
BY John E. Reilly
ATTORNEY { # United States Patent Office 3,090,716
Patented May 21, 1963

3,090,716
ADHESIVE TREATMENT AND ARTICLE OF MANUFACTURE
Bennie A. Stevens, Denver, Colo., assignor to The Gates Rubber Company, Denver, Colo., a corporation of Colorado
Filed Sept. 12, 1958, Ser. No. 760,688
12 Claims. (Cl. 154—52.1)

This invention is related to the treatment of natural and synthetic fibrous materials for the purpose of improving and materially strengthening the bond of such materials with natural and synthetic rubbers. This invention has more particular relation to an improved process of adhering synthetic fibrous materials, such as, polyester fibers sold under the trademark Dacron, to natural and synthetic rubber materials, together with products formed thereby.

Many of the synthetic or artificial fabrics, including yarns, filaments and the like, exhibit many superior properties over natural fibrous materials and are very often substituted for, or combined with, natural materials into articles of manufacture. For example, artificial fibrous materials are commonly employed as reinforcing members in rubber articles of manufacture, such as hose, tires, and belting. For many materials adhesives are available to provide adequate adhesive strength between the artificial fibrous material and the rubber material. In other cases, it is not possible to secure optimum adhesion between the synthetic material and the rubber-like material, and unfortunately, has been a deterrent to the successful use of many of the better synthetic materials. One such material is sold under the trademark Dacron, a polyester fiber, which exhibits many favorable characteristics rendering it especially adaptable for use as a reinforcing member in rubber-like articles of manufacture. However, it has been difficult to form a strong bond between the Dacron fibers and the rubber, so that the resultant product generally fails prematurely, due to separation and lack of bond between the Dacron and rubber.

It has been proposed in the past to modify the surface of the Dacron fibers with various compositions prior to incorporation of the Dacron into the rubber material. For example, a resorcinol-formaldehyde-latex composition in the form of an aqueous solution has been proposed and has been found to be generally successful with most of the artificial fibrous materials, with the exception of Dacron. The same applies to the isocyanate resins which are employed as bonding agents, either alone or in combination with a rubber cement with the express provision that the adhesive treatment be carried out in the absence of an aqueous, or water base, solution. More recently, in Patent No. 2,766,164, there is disclosed the use of either an aqueous latex solution, or the use of isocyanate resins forming a part of a non-aqueous cement, and discusses the inability in the use of either of the above to obtain the necessary adhesion between the Dacron fibers and the rubber. The above-mentioned patent goes on to suggest the combination of a polyisocyanate and a carbon black dispersed in a non-aqueous cement, so as to improve and materially strengthen the adhesion between the Dacron and rubber.

In any event, since the isocyanates are highly reactive materials and moisture-sensitive, the presence of water in the bonding or adhesive treatment has always been regarded as a deterrent to successful bonding, and it is the teaching of the prior art, that not only the isocyanate, but also the solvents applied and the fabric treated must be kept or maintained in as dry a condition as possible.

Contrary to past practices and theory, however, the present invention envisions the presence of water, such as, in the provision for a conventional water base adhesive in combination with the isocyanate resin in such a way as to secure greatly increased bond strength between rubber and fibrous materials, especially synthetic fibrous materials such as Dacron. In addition, notwithstanding the tendency of Dacron to shrink or contract when heated and especially in curing reinforced rubber articles, the present invention insures the necessary adhesive strength in cooperation with the article construction to prevent misalignment of the Dacron once positioned, both in curing the article and in actual operation. For example, it is now possible to gain the necessary adhesion and to incorporate the Dacron member into a power transmission belt in such a way as to prevent misalignment of the Dacron notwithstanding its tendency to contract during vulcanization, while at the same time utilizing this contractual property along with the strength of the Dacron to resist elongation or stretching of the belt in operation and also to secure greatly increased belt lift.

It is therefore a primary object of the present invention to provide an improved treatment for the bonding of natural and synthetic rubber-like materials to fibrous materials.

It is another object to provide for an improved process of bonding polyester fiber and polyamide materials to rubber-like materials, in which a more uniform and greatly increased adhesion is obtained therebetween.

It is a further object of the present invention to provide an improved method of treating Dacron for greatly improved adhesion and more intimate union with natural and synthetic rubber-like materials, and still further to obtain adhesion between the materials to a degree such that the strength of adhesion will be greater than the tear strength of the rubber itself.

It is a still further object of the present invention to provide for an improved rubber-like article of manufacture incorporating therein as a reinforcing member a layer of fibrous material, such as, Dacron cord or fabric, and coated by means of a novel and improved adhesive treatment in such a way as to obtain greatly increased adhesion between the fibrous and rubber-like material forming the article.

It is an additional object of the present invention to provide for an improved power transmission belt incorporating as a tensile member therein a layer or a number of spaced layers of coated polyester fibers supported in predetermined alignment throughout the belt against the tendency of the fibrous material to separate and contract.

The following is a description of the drawings:

FIGURE 1 is a side elevational view of the method of treating the yarn;

FIGURE 2 is a cross-sectional view of a V-type, side-driving belt;

FIGURE 3 is a cross-sectional view of the tensile member of the power transmission belt.

In accordance with the foregoing objects, the present invention contemplates, for instance, first the modification of a layer of synthetic fibrous material by application of an organic isocyanate solution, applying a second coating of a conventional water-base latex adhesive, then, where necessary, depositing a rubber cement onto the resultant modified material and associating it with a rubber material, and thereafter vulcanizing the combination so as to form in the desired manner a reinforced rubber-like article of manufacture. For the purpose of the present invention, the term "fibrous" will be understood to include fabrics, cords, yarns or other filamentous materials; and "rubber" will be understood to } include rubber substitutes, natural or synthetic rubber, and compounded or modified rubber unless otherwise specifically defined.

In combining the isocyanate and water-base latex adhesive, in a manner to be disclosed hereinafter in more detail, it is difficult to determine whether the adhesion is derived solely from a series of reactions between the fibers, isocyanate, and latex adhesive. In any event, it has been found that the presence of water definitely increases and improves the strength, and secures a more uniform physical bond, although completely opposed to past theory and practice in the art. Furthermore, it is possible that the N—C—O groups of the isocyanates react with the surface of the material to achieve a firm bond, then react with the active "H" ions and "OH" groups of the latex to secure improved adhesive properties. Thus, whether physical interlocking or chemical interlocking predominates is not definitely ascertainable, yet it is clear that surprisingly improved results are obtained, and are much superior to those which have been achieved in the past.

In a preferred manner of carrying out the adhesive treatment of the present invention, as shown in FIGURE 1, a polyisocyanate solution was placed in a suitably sized vessel 10, and Dacron cord or yarn 12 of 1100/2 denier was led through this solution by means of suitable guides and tensioning devices. The cord was then dried by means of a suitable heating arrangement, such as duct 13, at a temperature of 300° F., after which the cord was rolled, or wound, upon a bobbin 15. The cord was then removed from the bobbin and given a coating of a water-base latex as at 16, preferably a resorcinol-formaldehyde neoprene latex solution. Drying was again accomplished in a duct 18 in the same manner as described above, with the exception that the temperature was increased to 375° F. In order to facilitate fabrication with the rubber-like materials, a third coating of an organic solvent preferably composed of suitably compounded neoprene stock dissolved in benzol was applied to the surface of the coated cord as at 19 followed by drying at room temperature. The cord was then incorporated into rubber-like materials and vulcanized so as to form a reinforced article of manufacture.

To test its adhesive strength, the treated cord was laid onto a surface of uniform width strips of unvulcanized rubber material. Another rubber strip of the same width was applied over the surface of the cord, with the cord being laid perpendicular to the stock surface. The assembled cord and rubber were then placed in a mold and the cord tensioned to prevent cord movement during vulcanization. The assembly was then cured in a press under temperature and pressure. After removing the specimen from the mold and allowing it to cool, it was then cut into individual samples, with each sample being placed in a holder and subjected to flexing under weighted conditions in a well-known manner. The bond strength was measured on the basis of the time in minutes necessary for failure. As a basis of comparison, a bond strength value of 100 was obtained for untreated Dacron. Values higher than 100 would thus indicate improved bond strength, and of course, values lower than 100 indicate poorer bond strength. On the basis of the above, the bond strength of Dacron prepared according to the above method, was found to be 2600 under dynamic load conditions.

In the above treatment, the isocyanate solution preferably consists of 2% active methylene bis (4 phenyl isocyanate) sold under the trademark "MDI," 2% orthodichlorobenzene and 96% trichloroethylene, which may be prepared by dissolving or dispersing the isocyanate in the trichloroethylene at room temperature with mechanical agitation, after which the solution is placed in the vessel for the fabric treatment, as described. It will be evident, however, that various other types of polyisocyanates, polyisothiocyanates or a combination of both may be employed of the general formula OCN—R—NCS wherein R represents a divalent organic radical. Thus, the naphthalene diisocyanates and the toluene diisocyanates including MDI are typical examples, and together with any of the organic polyisocyanates which should later become available.

In addition, the amount or percentage by weight of isocyanate in the isocyanate solution has not been found to be critical, although gradually increasing amounts from 2% isocyanate in the solution have been found to increase the adhesive strength. Due to the expense of the isocyanates and their tendency to increase fiber degradation and stiffness when employed in excess amounts the upper limit of the percentage of isocyanate was not determined and entirely adequate adhesive strength can be obtained with the lower percentages of isocyanate dispersed in the solution. At the same time, with the use of the more reactive isocyanates, such as triisocyanates having three highly reactive isocyanate groups, it has been found that smaller percentages of the isocyanate may be employed to obtain the same results.

Although a benzene and ethylene solution has been used in the solution for the isocyanates, it will be apparent that the invention is not to be limited thereto and that any recognized solvent for the isocyanate is suitable.

Examples of conventional water base latex adhesives that may be applied in accordance with the present invention to the isocyanate modified Dacron surface are as follows:

TABLE I

| Adhesive | A | B | C |
| --- | --- | --- | --- |
| Gentac Latex | 100.00 | | |
| Neoprene Latex | | 100.00 | 100.00 |
| Resorcinol | 11.20 | 11.20 | |
| Formaldehyde | 4.40 | 4.40 | |
| Caustic Soda | 1.25 | 1.25 | |
| Aquablack B | 3.00 | 3.00 | 4.64 |
| Caseinate | | | 14.94 |
| Curative | | | 16.80 |
| Water (as required) | | | |

The type of latex polymer and/or the compounding ingredients used for this secondary coating have not appeared to be critical. Also, the proportion of adhesive to water may vary between broad limits, although it will be evident that sufficient adhesive should be present in the water to uniformly cover the cord or fibers, and for this purpose a 20% adhesive to 80% water solution has been found adequate. Of course, the amount of water present will also influence the amount of drying time necessary to dry the coated Dacron, and in this connection drying may be accomplished by any conventional heat source since no inflammability problem exists; also, the isocyanate solution and water base latex adhesive may be applied either by spreading, transfer rolls, but preferably by a dipping process. In addition, standard mixing equipment is satisfactory.

In processing the Dacron cord drying time and temperatures are controlled to obtain most effective adhesion and most favorable cord properties. Thus, after dipping in the isocyanate solution in the vessel 10, the cord is passed through a drying oven or duct 13 at temperatures in the range of 280° F. to 325° F. to dry the cord and to set the isocyanate and to encourage its reaction with the cord. In a second pass and following the application of the latex the treated cord is passed through another duct or oven 18 for an additional exposure and at an increased temperature above the crystalline melting point of the Dacron; for example, 350° F. to 450° F. Of course, time and temperature may be varied within suitable limits; also, stretching may be employed in a well-known manner to improve the characteristics of the Dacron in operation. Furthermore, it has been found that greatly improved results are obtained by means of a two-pass method, as described, rather than to attempt a single-pass method wherein the Dacron fiber is subjected to the same temperature after passing through the isocyanate solution and the latex cement solution respectively. As an example, it was attempted to first pass the Dacron fiber through a heat source, after application of the isocyanate, for a 60 second exposure at a speed of 10 yards per minute and at a temperature in the range of 280° F. to 325° F. Upon drying, an aqueous latex solution was applied to the Dacron cord by dipping just prior to reversing the direction of the cord, and it was then run through the same source at the same speed of 10 yards per minute for the same exposure time and temperature. The adhesive strength was reduced in this single-pass treatment by 60%. In another attempt, the modified Dacron cord was first passed through a single heat source for 20 seconds at a speed of 20 yards per minute under a temperature of 375° F. The latex was applied and the Dacron returned through the same source at the same rate of speed and temperature, but for a 30 second exposure, after which neoprene cement was applied and the Dacron wound upon a bobbin. Again, the adhesive strength was materially reduced. In a still further attempt, the Dacron cord was air-dried after application of the isocyanate solution for 1½ minutes prior to the first pass through the heat source, with little or no improved results over the other single-pass methods. Accordingly, the two-pass treatment is greatly preferred over the single-pass method because the time and temperature can be more closely controlled after each application.

The invention is further illustrated by the following examples:

Example 1

A solution containing 6% MDI, 6% orthodichlorobenzene and 88% trichloroethylene, was made up and applied to Dacron cord, as described in my preferred example. Upon coating with a latex solution and rubber cement and drying after each coating, the cord was then vulcanized to neoprene rubber and tested for bond strength in the manner above described. Under dynamic load conditions, the bond strength was found to be 7133.

Example 2

A solution containing 2% MDI, 2% orthodichlorobenzene and 96% trichloroethylene, was applied to the cord and dried, as per Example 1. Second and third coatings of a resorcinol-formaldehyde-neoprene latex solution were then applied, as in Formula B, Table I. Drying was accomplished between coatings. A fourth coating of neoprene cement was then applied, to aid in fabrication, and dried at room temperature. Under dynamic load conditions, the bond strength was found to be 28,001.

Example 3

The Dacron was subjected to the treatment per Example 2 without the application of cement. Dynamic bond strength was determined to be 18,930.

Example 4

In a first pass, the Dacron cord was run through a water bath, then directly into a 2% MDI solution, followed by drying. In a second pass, the cord was then run through a latex solution in accordance with Formula B, Table I, and then dried. Neoprene cement was applied during a third pass, followed by drying the modified Dacron surface at room temperature. Dynamic bond strength, in accordance with this method, was found to be 32,170.

Example 5

The Dacron cord was first passed through a solution containing triisocyanate, sold under the trademark "Mondur," followed by drying the cord. The solution consisted of 2% Mondur TM, 8% methylene chloride, and 90% trichloroethylene. In a second pass, a resorcinol-formaldehyde-neoprene latex, according to Formula B, was applied to the modified Dacron surface, again followed by drying. In a third pass, neoprene cement was applied to the surface and again dried at room temperature. Dynamic adhesion was determined to be 20,550.

In the last example, with the use of triisocyanate it has been found preferable to employ but a single pass through the latex solution. When the modified Dacron surface was passed through the latex solution twice, dynamic adhesive strength was decreased considerably. At the same time, in connection with the diisocyanate, it will be noted that where a double pass was employed in Example 2, adhesive strength was materially increased. The reason for this is not easily explainable, other than the fact that the triisocyanate reacts to a greater extent, especially in the presence of moisture than does the diisocyanate, and beyond a certain limit, will evidently decrease the adhesive strength obtainable.

It is to be noted from the above that adhesive strength was materially increased with increasing amounts of isocyanate. At the same time, it is preferred from the standpoint of cord stiffness and degradation to use the lower proportionate amounts of the isocyanate. Also, an increased number of passes through latex increased the adhesion strength; however, such does increase the cost of processing and a single pass through the latex will secure adequate adhesion.

Various other fibrous materials may be substituted for the Dacron cord in the above examples, and any fibrous material comprising a synthetic linear polymer oriented along the fiber axis and including other orientable linear polyamines and polyesters including the polyester formed by reacting terephthalic acid and a glycol such as ethylene glycol in the formation of Dacron. Also, the method of testing may be varied, in accordance with the type of fibrous material employed, and of course, various conventional methods of testing may be employed.

The Dacron material treated in accordance with the present invention has many favorable characteristics which, as mentioned, are desirable in reinforcement members for rubber products. Among others, these characteristics include high strength, resistance to impact, and low growth and stretch characteristics under heavy load conditions. In fact, the Dacron exhibits a tendency to shrink under heat especially during vulcanization which must be considered when incorporating the Dacron as a reinforcement member into rubber materials. Therefore, it is proposed not only to provide an improved adhesive treatment but also to incorporate the fibrous material so treated into rubber-like articles of manufacture in the unvulcanized state and in a unique way so as to take utmost advantage of the favorable properties of the Dacron while at the same time to neutralize any of its disadvantages. Accordingly, in order to properly support the Dacron, a heavily fiber-loaded stock material is preferably employed to hold the cord in predetermined alignment, yet maintain the desired flexibility of the product. Accordingly, the fiber-loaded section has application in products, such as tires and hose, wherein it will form an inner layer tending to resist inward movement of the Dacron reinforcement. Moreover, the fiber-loaded section has particular application to power transmission belting wherein the Dacron fibrous material may define a tensile or strain resisting member in the belt. As illustrated in FIGURE 2, a V-type, side-driving belt 20 may be conventionally formed of a compression section 22, a tensile section 23 and an overcord layer 24, together with outer fabric wrapper 25.

The compression section 22 is formed preferably of a rubber-like material having a high degree of rigidity so as to be resistant to deformation under lateral compression and, as mentioned, to prevent the inward movement of the Dacron tensile member. For this purpose, the compression section 22 is composed of a rubber stock material 26 incorporating therein in closely spaced relation a plurality of fibers 26' running transverse to the length of the belt and as shown, the fiber-loaded stock may define either all or just a part of the compression section. However, it is preferred that the fiber-loaded stock, where it forms only a portion of the compression zone, be disposed directly beneath the tensile section 23.

The tensile section 23 is comprised of a tensile member 27 spaced between the compression section and the overcord layer 24 by layers of adhesion gum 28. The tensile member 27, as shown in FIGURE 3, is formed by a layer of Dacron cords 29 coated in accordance with the treatment of the present invention with a film of isocyanate 30 and an outer film 31 composed of a water-based latex adhesive. To aid in fabrication, neoprene cement 32 forms a covering over the latex film so as to improve the tackiness of the coated Dacron when it is being handled and formed into the belt in the unvulcanized state.

The overcord layer 24 is also preferably composed of a fiber-loaded gum rubber stock 33, although it will be evident that gum rubber alone may be employed as the overcord layer. In building a belt it is preferable to do so in inverted form, in which case the overcord layer 24 is first applied in the form of a sheet around a drum, not shown. Adhesion gum is then applied over the sheet of fiber-loaded gum rubber 33 followed by spiraling the coated Dacron cord forming the tensile member 27 along the length of the drum with the strands in closely spaced relation. An additional thin layer of adhesion gum is then applied over the coated Dacron followed by application of the heavily fiber-loaded stock 26 forming the compression section 22 of the belt. The resultant band formed upon the drum may then be cut and skived in a conventional manner so as to form a number of belts of the desired width and cross section. The outer fabric layer 25 is then applied over the body of the belt preferably by a flipping operation and the individual belts are ready for curing.

Curing of the belt may then be carried out in a conventional mold, either in inverted or upright form.

The use of transverse fibers in the undercord layer is especially advantageous due to the compressibility and flexibility of the fiber-loaded rubber stock yet it provides the necessary support and transverse rigidity to resist any uneven inward movement of the Dacron cord material which would tend to cause misalignment of the tensile section 23, especially during curing. It is of course well-known to employ transverse fibers in the undercord and overcord sections of a belt. At the same time the application of such a section to a belt incorporating a coated Dacron tensile member in accordance with the present invention has been found to be particularly unique in the way in which it tends to neutralize and resist any tendency of the Dacron member to move inwardly when heated in operation. Furthermore, it does not detract from the other superior qualities of such a tensile member and in fact enhances the greatly improved adhesion qualities of the Dacron to prevent premature failure of the belt and in general to greatly improve its life.

In operation belts formed according to the present invention have been found to be outstanding in their ability to withstand high shock loads with very little tendency to grow or become elongated and loose after extended use. In addition, the operational life of the belts has been greatly extended due to the adhesion obtainable between the Dacron tensile member and the surrounding rubber-like layers, and as a result the belts have tended to fail due to normal fatigue rather than by separation along or adjacent to the tensile layer. From tests conducted on the belts made according to the present invention, operational life was found to increase belt life at least 300% over Dacron tensile member belts formed by presently known methods.

Having thus described my invention it will be apparent that various changes and variations in the method of treatment and construction may be varied without departing from the scope of my invention.

What is claimed is:
1. In a power transmission belt consisting in part of a rubber composition; a strain resisting member incorporated therein composed at least in part of polyethylene terephthalate polyester fibers, said strain resisting member bonded to the rubber portion by first treating said strain resisting member with an organic compound having a plurality of isocyanate groups and then chemically reacting a water based latex with the remaining available isocyanate groups of the isocyanate treated strain resisting member.

2. A reinforced rubber article incorporating in tightly adhering relation therewith a fibrous material containing polyethylene terephthalate polyester fibers said fibrous reinforcing material bonded to the rubber portion by first treating the fibrous material with an organic compound having a plurality of isocyanate groups and then chemically reacting a water based latex with the remaining available isocyanate groups of the isocyanate treated fibrous material.

3. The method of treating a fibrous material to be incorporated into a vulcanizable rubber article comprising: first applying to the fibrous material containing polyethylene terephthalate polyester fibers a solution of an organic compound having a plurality of isocyanate groups, then chemically reacting the isocyanate treated fibrous material with a water base latex solution, drying the surface of said fibrous material, and then incorporating the fibrous material into the vulcanizable rubber article.

4. The method according to claim 3 wherein said fibrous material is composed of a polyethylene terephthalate polyester fiber.

5. In the method of manufacturing reinforced rubber articles, the steps comprising: applying a solution of an organic compound having a plurality of isocyanate groups to a polyethylene terephthalate polyester fiber reinforcing material, drying the modified surface, then applying a coating of an aqueous latex solution to the reinforcing material, drying the surface of the reinforcing material, and followed by applying a layer of rubber cement to aid in fabrication, and again drying prior to incorporation of the reinforcing material into the rubber article.

6. In the method of manufacturing reinforced rubber articles, the steps comprising: applying a solution of an organic compound having a plurality of isocyanate groups to a polyethylene terephthalate polyester fiber reinforcing material, drying the modified surface, then chemically reacting the dried reinforcing material with a water based solution of a latex adhesive, and again drying the surface at an elevated temperature.

7. In the method according to claim 6 in which the organic compound in solution has a plurality of groups selected from isocyanate, isothiocyanate and mixed isocyanate-isothiocyanate groups.

8. In the method according to claim 6 characterized by applying to the polyester fiber reinforcing material a second coating of an aqueous latex adhesive, and thereafter drying the second coating prior to incorporation into a rubber article.

9. In the method according to claim 6 wherein the isocyanate groups are present in the form of methylene bis (4 phenyl isocyanate).

10. The method of manufacturing a rubber article having incorporated therein a fibrous reinforcing material comprised at least in part of polyethylene terephthalate polyester fibers, comprising the steps of passing the fibrous material through an organic polyisocyanate solution, drying the material to remove substantially all of the moisture through the application of heat, then passing the reinforcing material through an aqueous solution of a latex adhesive, again drying through the application of heat to remove substantially all of the moisture present, applying a coating of rubber cement to aid in fabrication followed by additional drying, associating the resultant structure in predetermined relation with a vulcanizable rubber and vulcanizing so as to form a reinforced rubber article.

11. The method according to claim 10 wherein the fibrous reinforcing material is dried at a temperature in the range of 280° F. to 325° F. following application of the polyisocyanate solution, and then dried at a temperature of 350° F. to 450° F. following application of the latex adhesive.

12. The method of manufacturing a rubber article having incorporated therein a fibrous material comprising the steps of applying to a fibrous material containing polyethylene terephthalate fibers an organic solution containing a plurality of isocyanate groups, drying the fibrous material at an elevated temperature to substantially remove all of the solvent of said solution of isocyanate compound, passing the reinforcing material through an aqueous solution of a latex adhesive, again drying the fibrous material at an elevated temperature to remove substantially all of the moisture present, subsequently applying an additional coating of rubber based cement, drying the fibrous reinforcing material at an elevated temperature, placing the resultant treated fibrous reinforcing material into contact with a vulcanizable rubber and then vulcanizing the assembled structure so as to form a unitary reinforced rubber article.

References Cited in the file of this patent
UNITED STATES PATENTS

| | | |
|---|---|---|
| 2,415,839 | Neal et al. | Feb. 18, 1947 |
| 2,570,895 | Wilson | Oct. 9, 1951 |
| 2,650,212 | Windemuth | Aug. 25, 1953 |
| 2,698,242 | Saner | Dec. 28, 1954 |
| 2,766,164 | Salem | Oct. 9, 1956 |

FOREIGN PATENTS

| | | |
|---|---|---|
| 118,839 | Australia | Aug. 17, 1944 |

OTHER REFERENCES

"The Chemistry of Commercial Plastics," by R. L. Wakeman, pub. in 1947 by Reinhold Publishing Corp., New York City, N.Y.